(12) United States Patent
Brown

(10) Patent No.: US 6,629,800 B1
(45) Date of Patent: Oct. 7, 2003

(54) FOLDABLE MAP BOOK

(75) Inventor: Michael E. Brown, Sarasota, FL (US)

(73) Assignee: Streetwise Maps Inc., Sarasota, FL (US)

( * ) Notice: Subject to any disclaimer, the term of this patent is extended or adjusted under 35 U.S.C. 154(b) by 9 days.

(21) Appl. No.: 09/776,082

(22) Filed: Feb. 2, 2001

(51) Int. Cl.$^7$ .................................................. B42F 3/10
(52) U.S. Cl. ............................ 402/58; 402/79; 281/38; 281/21.1
(58) Field of Search .............................. 283/34, 61, 35, 283/62; 281/2, 3.1, 15.1, 21.1, 38, 29; 402/70, 73, 58, 79

(56) References Cited

U.S. PATENT DOCUMENTS

| | | |
|---|---|---|
| 1,009,687 A | 11/1911 | Patton |
| 2,831,279 A * | 4/1958 | Esslinger et al. .............. 402/57 |
| 2,889,638 A | 6/1959 | Anderson |
| 4,544,586 A | 10/1985 | Molari, Jr. |
| 4,595,309 A | 6/1986 | Chinchar |
| 4,673,197 A | 6/1987 | Shtipelman et al. |
| 4,765,462 A | 8/1988 | Rose, Jr. |
| 4,890,728 A | 1/1990 | Grimsley |
| 5,029,899 A | 7/1991 | Schieppati et al. |
| 5,029,902 A * | 7/1991 | Komori ........................ 283/34 |
| 5,036,973 A | 8/1991 | Aida |
| 5,063,637 A | 11/1991 | Howard, Jr. et al. |
| 5,156,898 A | 10/1992 | McDonald |
| 5,273,432 A | 12/1993 | White |
| 5,306,048 A | 4/1994 | Park |
| 5,358,761 A | 10/1994 | McDonald |
| 5,419,586 A | 5/1995 | Golsen |
| 5,584,387 A | 12/1996 | Grant |
| 5,868,429 A | 2/1999 | Raymond et al. |
| 5,894,923 A | 4/1999 | Hamstra et al. |

* cited by examiner

Primary Examiner—Willmon Fridie, Jr.
(74) Attorney, Agent, or Firm—Dilworth & Barrese LLP

(57) ABSTRACT

A book structure having front and back covers bound together along a spine, with pages therein being secured to the back cover by a binder mounted exclusively upon the back cover, separate and apart from the spine.

6 Claims, 5 Drawing Sheets

(2 of 5 Drawing Sheet(s) Filed in Color)

FOLDABLE MAP BOOK

The present invention is directed to a new and improved book comprising foldable pages therebetween. In particular, the present invention is directed to a new and improved book comprising foldable maps which provides for facilitated, easy handling by an individual, especially under cumbersome conditions, e.g., while in a moving vehicle.

Cartographic material has been provided in a variety of bound forms to improve handling. For example, U.S. Pat. No. 5,419,586 to Golson discloses bound cartographic material comprising a plurality of rectangular leaves 12 containing maps, a back cover portion 24 and a front cover 16, with all components being bound together through ring binding means 14. The front cover 16 is foldable along an edge 32 into two separate first 20 and second 22 panels, with the structure being designed to facilitate use by a motorist. However, the structure of this map book requires two hands to safely and correctly unfold and examine the maps contained therein, e.g., a hand to flip the various map pages about the binder 57 or 157.

Accordingly, it is an object of the present invention to provide a new and improved book structure which allows an individual to quickly and securely open and examine the contents thereof and close the same with minimal movement.

It is a more particular object of the present invention to provide an improved bound volume of cartographic material that can be expeditiously used in a safe, secure manner with minimal movement, and at the same time, being protected from damage when in use condition.

It is a further object of the present invention to provide an improved collection of cartographic material in which larger areas of cartography can be presented to a user in an easy, safe and expeditious manner, improving dissemination of cartographic information.

It is another object of the present invention to facilitate presentation of cartographic information in a safe, expeditious, convenient and inexpensive manner.

It is yet a further object of the present invention to provide a collection of cartographic information which is easy to manufacture and effective to present, thus conserving resources.

SUMMARY OF THE INVENTION

These and other objects are attained by the present invention which is directed to a book structure comprising a front cover, a back cover, and at least page divided into at least two panels and being mounted upon the binder to be foldable into the book structure between the two covers and unfoldable out from between the two covers in accordion fashion. The panels preferably contain maps.

The inventive book structure is easy to open and close, e.g., with just single hand if necessary, facilitating use under cumbersome conditions, e.g., by a motorist or a passenger in a vehicle. For example, when a vehicle is stopped, e.g., at a red light, the motorist can quickly open and unfold the map to check location and reclose the same in a safe, quick and effective manner. The inventive structure is easy to manufacture with a minimal amount of components and, at the same time, increases the amount of cartographic material that can be presented to an individual over previous bound map structures.

BRIEF DESCRIPTION OF THE DRAWINGS

The claim of this patent contains at least one drawing executed in color.

The features of the presently claimed invention will be described in greater detail by reference to the accompanying drawings in which

DESCRIPTION OF THE PREFERRED EMBODIMENT

Figures 1, 2:
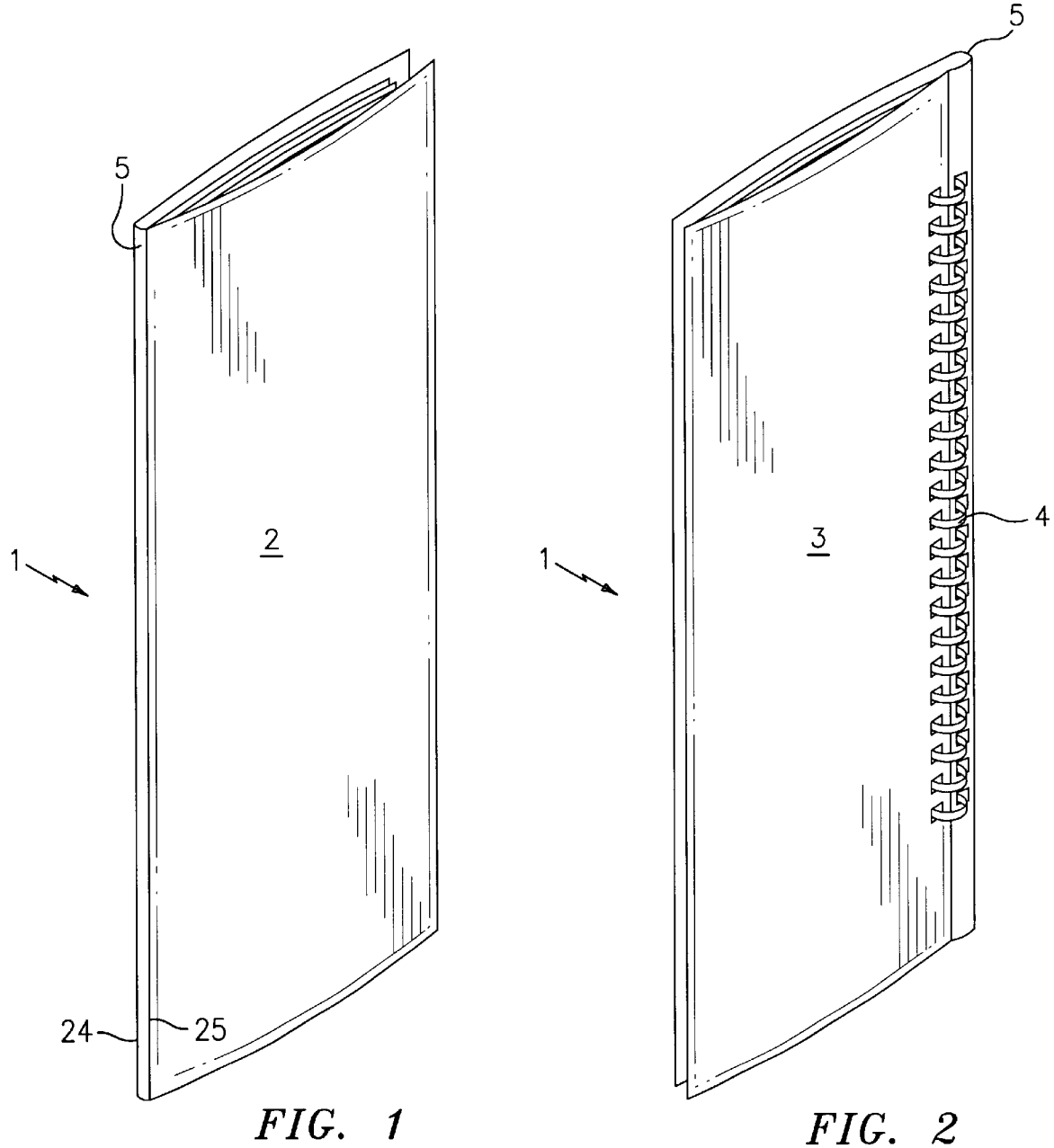
FIG. 1 is a front perspective view of the inventive structure in closed condition.
FIG. 2 is a perspective view of the back of FIG. 1.

Referring to the drawings, FIG. 1 illustrates a book structure 1 in accordance with the present invention comprising a front cover 2, a back cover 3 and a spine 5 interconnecting front cover 2 and back cover 3. In the illustrated embodiments, the spine 5 is connected to the respective front 2 and back 3 covers along fold lines 24 and 25 as best seen in FIG. 1. A binder 4 is mounted upon the back cover 3, separate and apart from the spine 5 interconnecting the front 2 and back 3 covers. In the illustrated embodiment, the binder 4 is a spiral binder formed of metallic or resilient material that is clipped or wound into respective adjacent perfections mechanism that effectively retains pages 6, 6', 6" and 6''', etc. upon the back cover 3, e.g., an adhesive structure, or a wire-O binder or even a plastic (spiral) binder.

Figure 3:
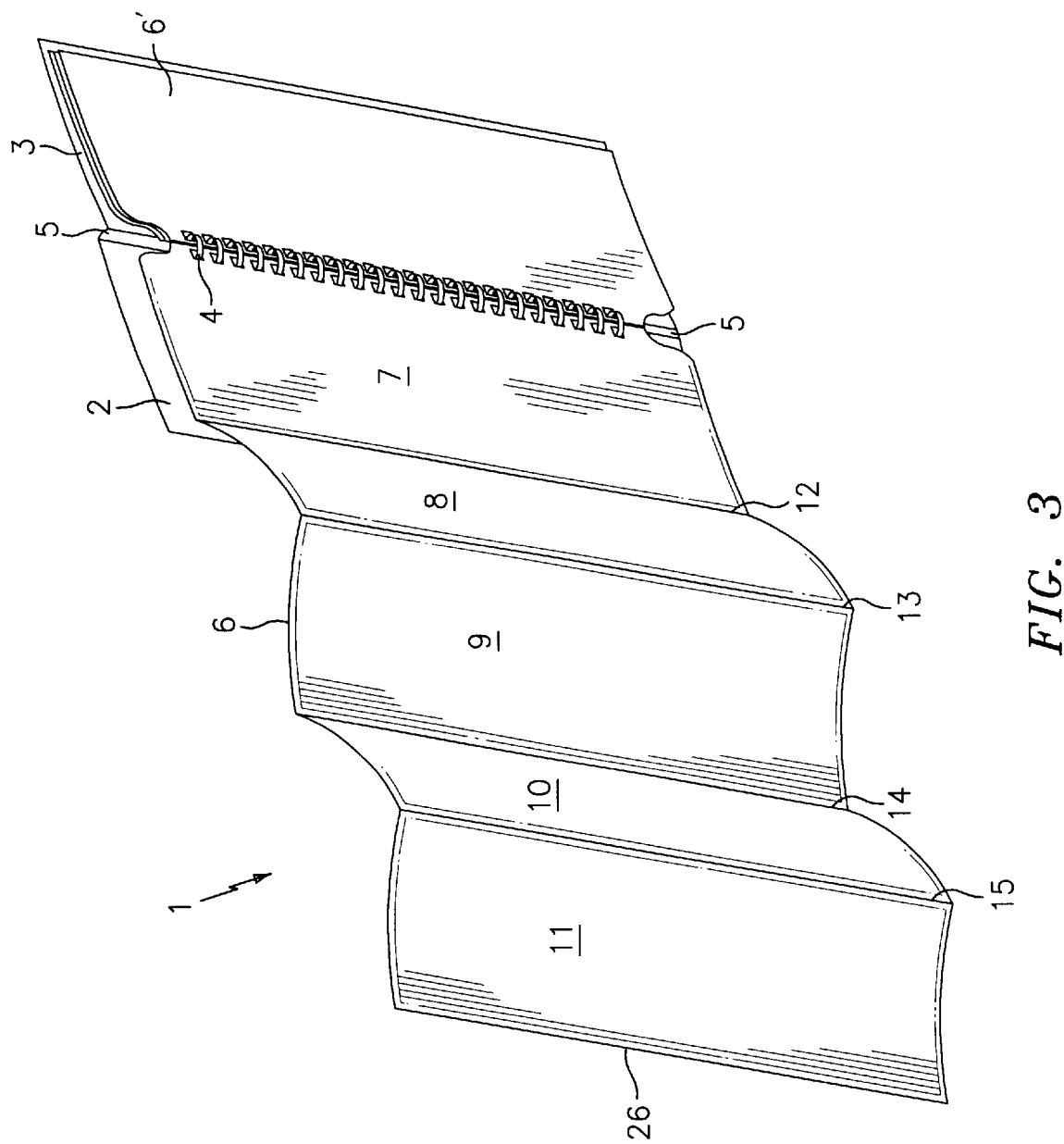
FIG. 3 is a schematic view of the structure shown in FIG. 1 with one page being partially folded out therefrom.

Page 6, illustrated in unfolded condition in FIG. 3, is divided into several panels 7, 8, 9, 10 and 11 connected together along respective fold lines 12, 13, 14, 15 such that the page 6 is structured and angled to be unfolded from the back cover 3 as an accordion; page 6 is simply refolded in opposite direction to become situated between front cover 2 and back cover 3 when the book structure is closed, as illustrated in FIGS. 1 and 2. Page 6' is illustrated in FIG. 3 as a comprising five panels 7–11. However, page 6 may be divided into an infinite number of panels as required. The respective folded lines 12–15 extended in a direction substantially perpendicular to the direction of unfolding/refolding of page 6. The page 6 and panels 7–11 thereof preferably contain cartographic information, i.e., maps. The arrangement of cartographic information in this fashion facilitates use and retrieval of such information under inconvenient or cumbersome conditions.

For example, if necessary, the page 6 can be unfolded with a single hand grasping the book, opening the covers 2 and 3 apart from one another, and allowing page 6 to slightly drop and unfold in accordion fashion. The opposite hand which might be situated, e.g., up a steering wheel of a vehicle, can then grasp the outer edge 26 of outermost panel 11 to steady the page of cartographic information. To open the book structure 1, the cover 2 can be conveniently flipped open and out of the way when the binder 4 supporting page 6 is completely mounted upon the back cover 3, separate and apart from the spine 5 interconnecting the front 2 and back 3 covers along the folded lines 24, 25. This improves over prior art structures when both front and back covers and interior pages are all mounted upon the binder which forms the spine, or the binder itself is mounted along the spine interconnecting the front and back covers.

The binder structure 1, accompanying pages 6, 6', 6", 6''', etc. and front 2 and back 3 covers can be manufactured from paper and/or cardboard-based material. The pages can be formed of clear plastic and, e.g., provided with pockets in the individual panels to contain individual maps. Furthermore. The pages can be formed of laminated paper or other sturdy material to enhance rigidity of each panel and improve handling by an individual.

Figure 4:
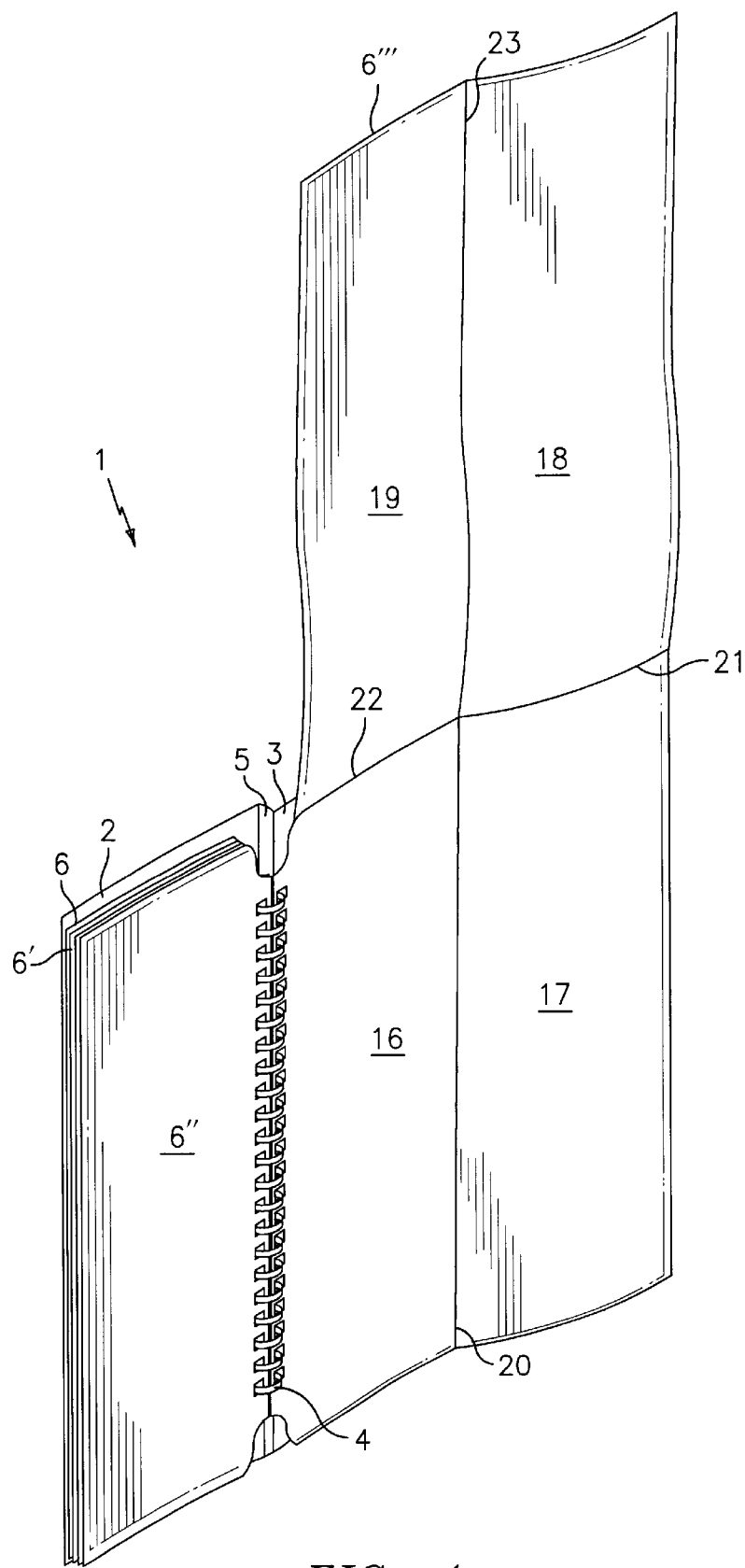
FIG. 4 is a schematic view, similar to FIG. 3, of a different embodiment of the inventive structure and showing a different page folded out therefrom.

The illustrated embodiment contains three pages 6, 6', 6" arranged to unfold and refold in similar accordion fashion. However, any number of pages can be provided in the inventive book structure according to need. FIG. 4 illustrates an alternative arrangement in which an additional page 6''' is divided into four panels 16–19 such that two panels 16 and 17 are connected together along a folded line 20 extending substantially perpendicular to an initial direction of unfolding from between the front 2 and back 3 covers and two panels 18 and 19 are respectively coupled to panels 17 and 16 along edges 21, 22 extending substantially parallel to the first direction of unfolding and coupled together along a folded line 23 extending parallel to and forming an extension of fold line 20. Thus, in the embodiment shown in FIG. 4, page 6''' is first unfolded by moving all panels 16–19 in a direction substantially parallel to edges 21, 22 (similar to the accordion unfolding of pages 6, 6', 6"), and then unfolding panels 18 and 19 in a substantially perpendicular direction. Page 6''' may be constructed from similar materials as pages 6, 6', 6" described supra with any number of pages of similar structure be provided as required.

Figure 5:
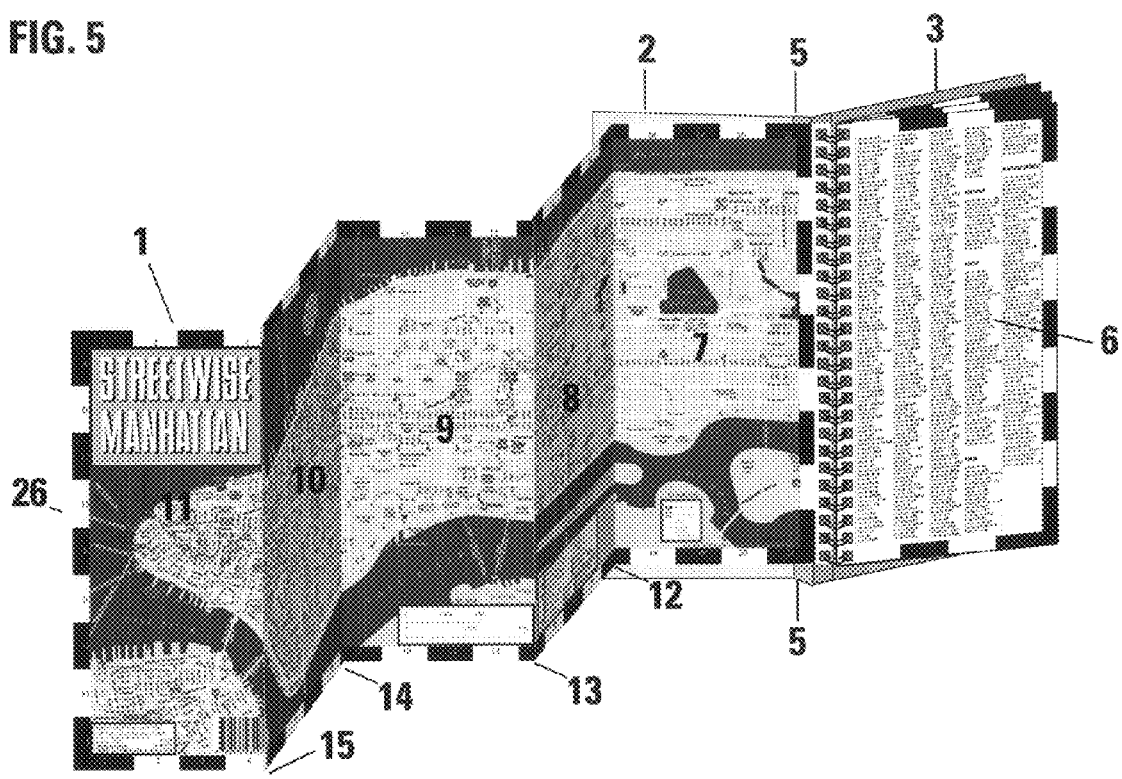
FIG. 5 is a schematic view similar to FIG. 3 and illustrating arrangement of a map upon panels forming the folded out page and map index upon an opposite page.

As shown in FIG. 5, a map is arranged upon the various foldable panels 7, 9 and 11 of the accordion-folded page 6, with the map surrounded by alternating black and white map grid borders. This facilitates ascertaining a particular location upon the map itself. The index for the particular fold-out map illustrated appears on a page 6' on the opposite side of the binder 4. This index lists the particular grid by abscissa and ordinate (number and letter) where a particular site is located upon the map, e.g., a street, avenue, etc. This arrangement especially enhances ease by which the map can be handled to ascertain directions for travel. The map can be quickly perused with the appropriate index of grid location appearing on the opposite page 6', thus expediting handling and examination of the map to identify location and concomitant direction for travel therefrom and/or thereto. Not only is handling of the map to ascertain directions expedited; by such improved arrangement, danger of vehicular mishap is reduced because location and/or direction can be quickly ascertained with minimal handling of the map.

Figure 6:
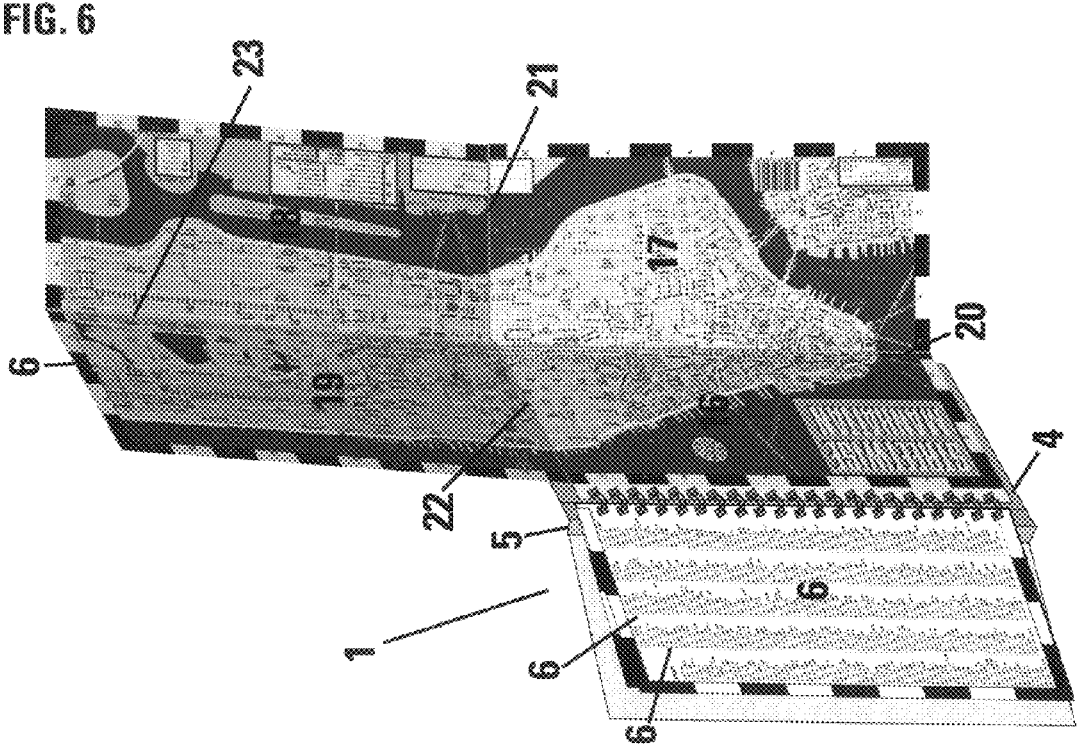
FIG. 6 is a schematic view similar to FIG. 4 and illustrating arrangement of a map upon panels forming the folded out page and a map index upon an opposite page.

In the embodiment shown in FIG. 6, the map containing the black-and-white grid borders appears upon foldable panels 16–19 of page 6''', and the map grid index upon the adjacent page 6" on the opposite side of ring binder 4. This arrangement also facilitates handling and ascertaining location and directions with the map with minimal effort. In the embodiment illustrated in FIGS. 5 and 6, water is denoted by the color purple, landforms by the color gray and streets by the color white to enhance visual comprehension.

The preceding description of the present invention is merely exemplary and is not intended to limit the scope thereof in any way.

What is claimed is:

1. A book structure, comprising a front cover;

a back cover;

a spine interconnecting said front cover and back cover;

a binder mounted upon said back cover; and at least one page divided into at least two panels and be mounted upon said binder to be foldable into said structure between said two covers and unfoldable out from between said two covers in accordion fashion;

wherein said panel contains maps;

said binder is a spiral binder mounted upon said back cover in recesses provided in said back cover; and said at least one page comprises at least two first panels coupled together along a first fold line extending in a direction substantially perpendicular to an initial direction of unfolding between said front and back cover and at least two second panels coupled to said two first panels along an edge extending substantially parallel to said initial unfolding direction and, in turn, coupled together along a second fold line extending substantially parallel to said first fold line in unfolded condition;

such that after said two first panels are unfolded from between said front and back covers, said two second panels are unfolded in a second direction to extend, in completely unfolded condition, substantially perpendicular to said initial direction.

2. The structure of claim 1, wherein said spine is coupled to said first cover along a fold line and to said back cover along a fold line.

3. The structure of claim 1, wherein a map appears upon said foldable panels and an index to a grid of the map appears upon an adjacent page.

4. The structure of claim 3, wherein the borders of the map denoting the grid are constituted by alternating black and white sections.

5. The structure of claim 4, wherein water on the map is denoted by the color purple, land forms by the color gray and streets by the color white.

6. The structure of claim 1, wherein water on the map is denoted by the color purple, land forms by the color gray and streets by the color white.

\* \* \* \* \*